Figure 1:
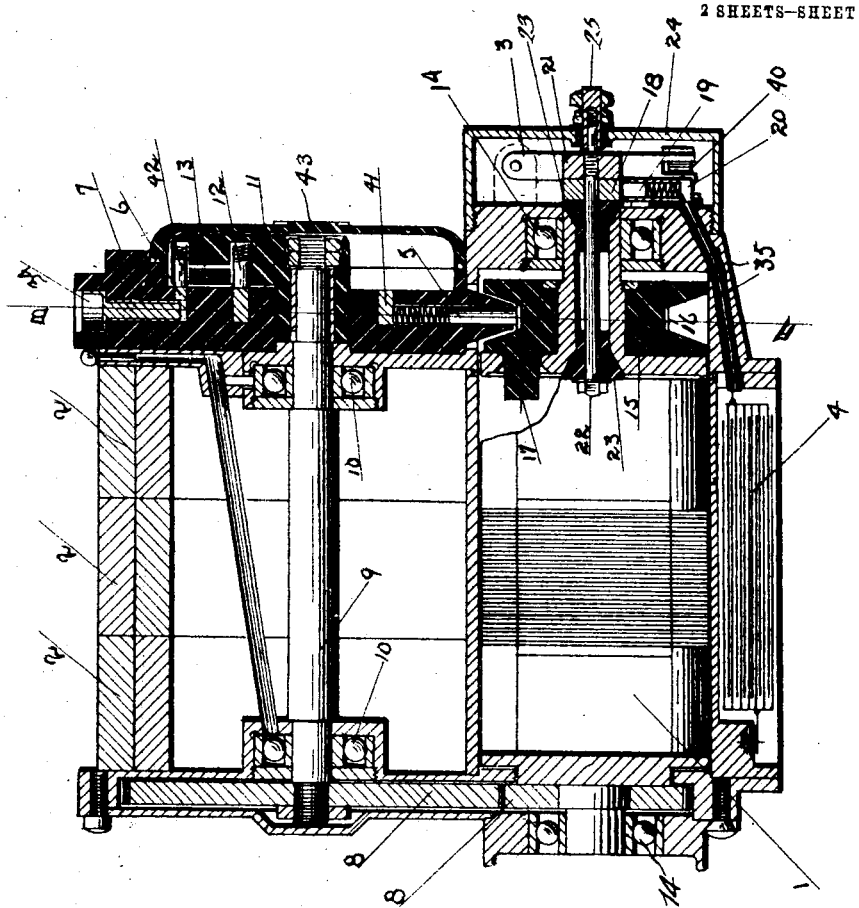

C. A. STONE & G. C. BROWN.
MAGNETO ELECTRIC GENERATOR.
APPLICATION FILED SEPT. 8, 1908.

1,128,914.

Patented Feb. 16, 1915.

WITNESSES

INVENTORS
Chester A. Stone.
Garnet C. Brown.
BY
ATTORNEY

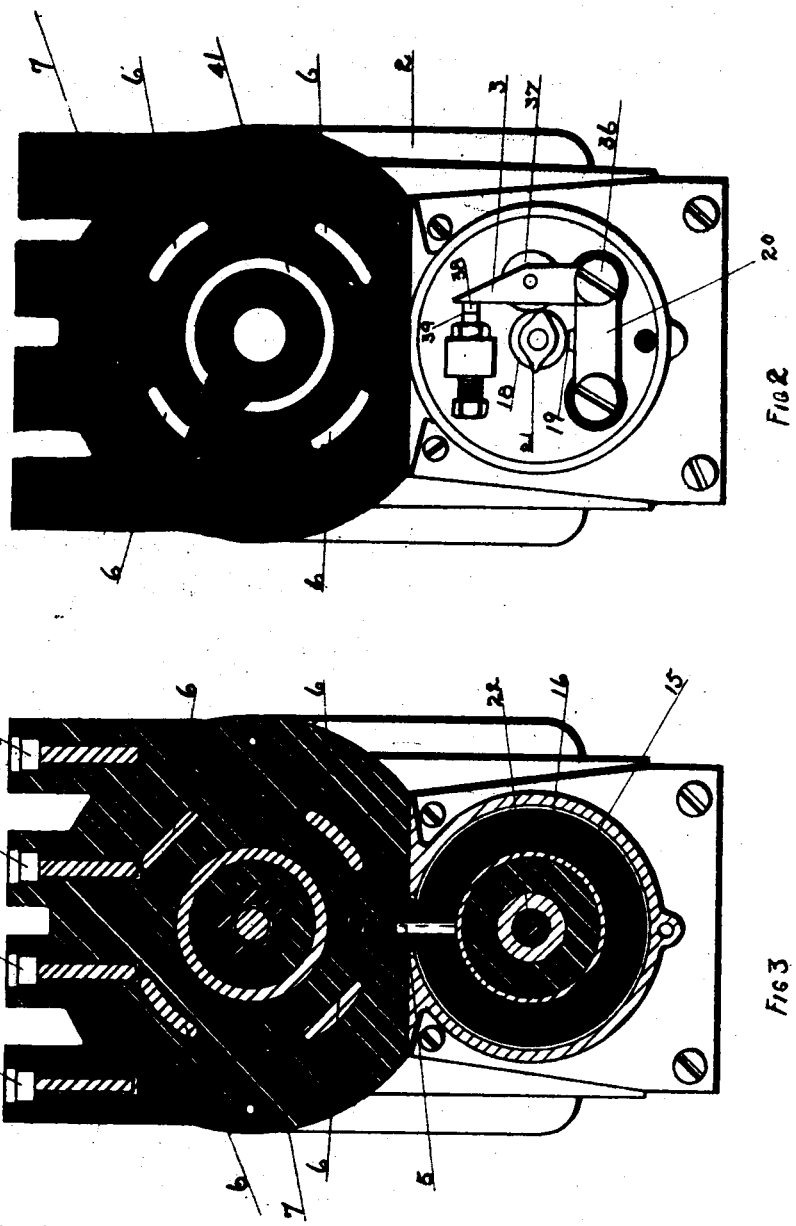

UNITED STATES PATENT OFFICE.

CHESTER A. STONE AND GARNET C. BROWN, OF BUFFALO, NEW YORK, ASSIGNORS, BY DIRECT AND MESNE ASSIGNMENTS, OF ONE-THIRD TO SAID STONE, ONE-THIRD TO CHARLES B. MOULTHROP, AND ONE-THIRD TO LUCIAN C. JACKSON, BOTH OF BUFFALO, NEW YORK.

MAGNETO-ELECTRIC GENERATOR.

1,128,914.     Specification of Letters Patent.     Patented Feb. 16, 1915.

Application filed September 8, 1908. Serial No. 451,992.

*To all whom it may concern:*

Be it known that we, CHESTER A. STONE and GARNET C. BROWN, citizens of the United States, and residents of the city of Buffalo, in the county of Erie and State of New York, have invented or discovered certain new and useful Improvements in Magneto-Electric Generators, of which the following is a specification.

The object of our invention is to provide a magneto electric generator capable of producing powerful jump sparks for igniting the explosive mixtures in a hydrocarbon engine or for other similar purposes; to provide improved means of construction whereby the current generated by the armature is conducted directly to the distributer without passing through bearing parts and thereby rendering the same simple and certain in action; and in the novel features of construction and combination of parts hereinafter set forth.

In the accompanying drawings, Figure 1 is a sectional elevation through the center of the generator. Fig. 2 is an end elevation of the generator with the distributer and circuit breaker covers removed. Fig. 3 is a section through the distributer and collector ring on the line A B of Fig. 1.

In the drawings, 1 indicates an armature having a primary and a secondary winding in the ordinary manner for generating a low and a high tension current when revolved in the magnetic field produced by the permanent horseshoe magnets 2, 2, 2. A circuit breaker which consists of an arm 3 pivoted at 36 and carrying a roller 37 and having a contact point 38 keeps the circuit of the primary current closed when in touch with the contact point 39.

19 is a brush made of conducting material and held in position in a socket in the bracket 20 and in contact with the primary current collector 18 by means of spring 40.

4 is a condenser in the base of the generator where it is protected from dust and dampness and connected to the brush 18 by the wire 35.

21 is a cam having two opposite projections each of which strikes the roller 37 in every revolution of the armature 1 and by so doing separates the points 38 and 39.

22 is a rod which holds the primary current collector 18 and cam 21 in position and also conducts the primary current from the primary armature winding to the collector 18. The rod 22, collector 18 and cam 21 are insulated from the generator by means of the insulating bushings 23, 23.

25 is a connection for a wire leading to a suitable switch, for use in stopping the action of the generator.

The secondary or high tension current is conveyed from the armature winding through the connecting wire 17 to the collector ring 16, which is mounted on the insulating collector 15, then through the collector brush 5, distributer ring 41, distributer brushes 12 and 42, which are mounted in the distributer arm 11 and connected by conductor 13, then through the various contacts 6, 6, 6, 6, and contact plugs 34, 34, 34, 34 to the sparking plug of a motor.

7 is a block of insulating material mounted on one end of the generator and above the collector ring 16 through which the high tension current is conducted by means of the brush 5, distributer ring 41, contact 6, 6, 6, 6 and plugs 34, 34, 34, 34 which are embedded in it.

43 is a cover to inclose the distributer arm 11 and 24 a cover to inclose the circuit breaker mechanism.

8, 8 are gears for conveying motion from the armature shaft to the distributer shaft 9.

10, 10 are the distributer shaft bearings.

14, 14 are the armature shaft bearings.

The operation of the generator is as follows: The armature 1 is first made to revolve by means of the driving shaft 27 and in the magnetic field produced by the permanent horse-shoe magnets 2, 2, 2 when at each one-half revolution the magnetic lines of force generate a current in the primary or low tension circuit which increases in strength until the polarity of the magnetic field begins to change. At this moment the circuit of the primary winding is broken by the cam 21 lifting the arm 3 and separating the contact points 38 and 39, when a secondary or high tension current is induced in the secondary winding of the armature by the rapid demagnetization of the iron core of the armature. The rapidity of this demagnetization is increased by the condenser 4. The secondary or high tension current induced in the secondary winding is collected by means of the ring 16 and conveyed successively to the various contact plugs 34, 34, 34, 34 by means of the distributer arm 11 which is rotated by the gears 8, 8, and then to the spark plug of a motor.

We do not restrict ourselves to the precise construction of the details herein shown, but various changes may be resorted to within the scope of our claims hereinafter contained.

Having described our invention, what we claim as new and desire to secure by Letters Patent, is—

1. In a magneto electric generator, permanent magnets, an armature having primary and secondary windings and located between the poles of said magnets, a distributer shaft located in said magnets and driven by gearing from the driven end of said armature, a collector ring mounted on the shaft of said armature opposite to its driven end, a distributer ring mounted on said distributer shaft in juxtaposition to said collector ring and elastically connected therewith by means of a collector brush.

2. In a magneto electric generator, the combination, of an armature having a primary and a secondary coil wound thereon, a sparking device in the circuit of the secondary coil and means to collect and distribute the current from said secondary coil to said sparking device, said means consisting of a collector ring mounted on, and insulated from, the shaft of said armature, a collector brush connecting said collector ring with a distributer ring, contacts located around said distributer ring, distributer brushes in a distributer arm and contact plugs connected with said contacts, said collector brush, distributer ring, contacts and contact plugs located in one piece of insulating material in juxtaposition to said collector ring, substantially as set forth.

In testimony whereof we affix our signatures in the presence of two witnesses.

CHESTER A. STONE.
GARNET C. BROWN.

Witnesses:
 LUCIAN C. JACKSON,
 CLINTON T. HORTON.